(12) United States Patent
Liu et al.

(10) Patent No.: US 11,463,215 B2
(45) Date of Patent: Oct. 4, 2022

(54) TRANSMISSION RESOURCE INDICATION METHOD, NETWORK DEVICE, AND TERMINAL

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Yue Ma, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 38 days.

(21) Appl. No.: 17/094,710

(22) Filed: Nov. 10, 2020

(65) Prior Publication Data

US 2021/0067292 A1 Mar. 4, 2021

Related U.S. Application Data

(63) Continuation of application No. PCT/CN2019/086128, filed on May 9, 2019.

(30) Foreign Application Priority Data

May 11, 2018 (CN) .......................... 201810451277.4

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC .......................... H04L 5/0048; H04W 72/042
See application file for complete search history.

(56) References Cited

U.S. PATENT DOCUMENTS

| | | | | |
|---|---|---|---|---|
| 2015/0223153 | A1* | 8/2015 | Sawada | H04W 72/0453 |
| 2019/0045395 | A1* | 2/2019 | Wu | H04W 74/0833 |
| 2020/0029289 | A1 | 1/2020 | Liu | |
| 2020/0221508 | A1 | 7/2020 | Huang et al. | |
| 2020/0229180 | A1* | 7/2020 | Liu | H04L 5/0051 |
| 2021/0076427 | A1* | 3/2021 | Li | H04W 74/006 |

FOREIGN PATENT DOCUMENTS

| | | |
|---|---|---|
| CN | 107278383 A | 10/2017 |
| CN | 108012329 A | 5/2018 |
| WO | 2018/049274 A1 | 3/2018 |

OTHER PUBLICATIONS

CN Office Action in Application No. 201810451277.4 dated Apr. 3, 2020.
"Considerations on RACH design" Samsung, 3GPP TSG RAN WG1 Meeting #89, R1-1707939, May 15, 2017.
(Continued)

*Primary Examiner* — Ronald B Abelson
(74) *Attorney, Agent, or Firm* — Maschoff Brennan

(57) ABSTRACT

A transmission resource indication method, a network device, and a terminal are provided in this disclosure. The transmission resource indication method includes: sending auxiliary information that satisfies a preset format, where the auxiliary information is used to indicate a first synchronization signal block SSB that is actually sent and a second SSB associated with a target physical channel.

20 Claims, 3 Drawing Sheets

(56) References Cited

OTHER PUBLICATIONS

"Discussion on RACH design" Samsung, 3GPP TSG RAN WG1 Meeting #Adhoc 2, Jun. 27, 2017.
Written Opinion and International Search Report PCT/CN2019/086128 dated Nov. 26, 2020.
EP Search Report in Application No. 19799194.6 dated May 12, 2021.
"Summary of Remaining Details on RACH Procedure" 3GPP TSG RAN WG1 Meeting 90bis, R1-1719025, Qualcomm, Oct. 9, 2017.
"Remaining details of RACH procedure" 3GPP TSG RAN WG1 Meeting AH 1801, R1-1800084, ZTE, Sanechips, Jan. 22, 2018.
"NR RACH procedures" 3GPP TSG RAN WG1 Meeting #92, R1-1802387, Intel Corporation, Feb. 26, 2018.

* cited by examiner

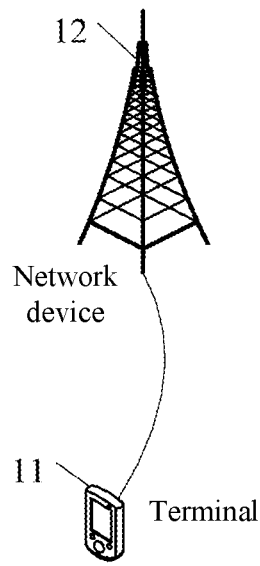
FIG. 1
Send auxiliary information that satisfies a preset format, where the auxiliary information is used to indicate an actually sent first synchronization signal block SSB and a second SSB associated with a target physical channel ⟋21
FIG. 2
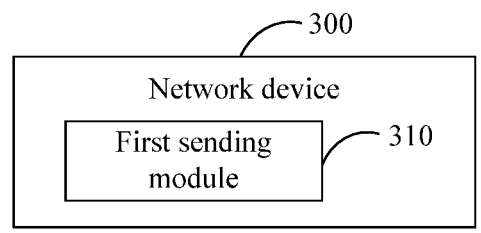
FIG. 3

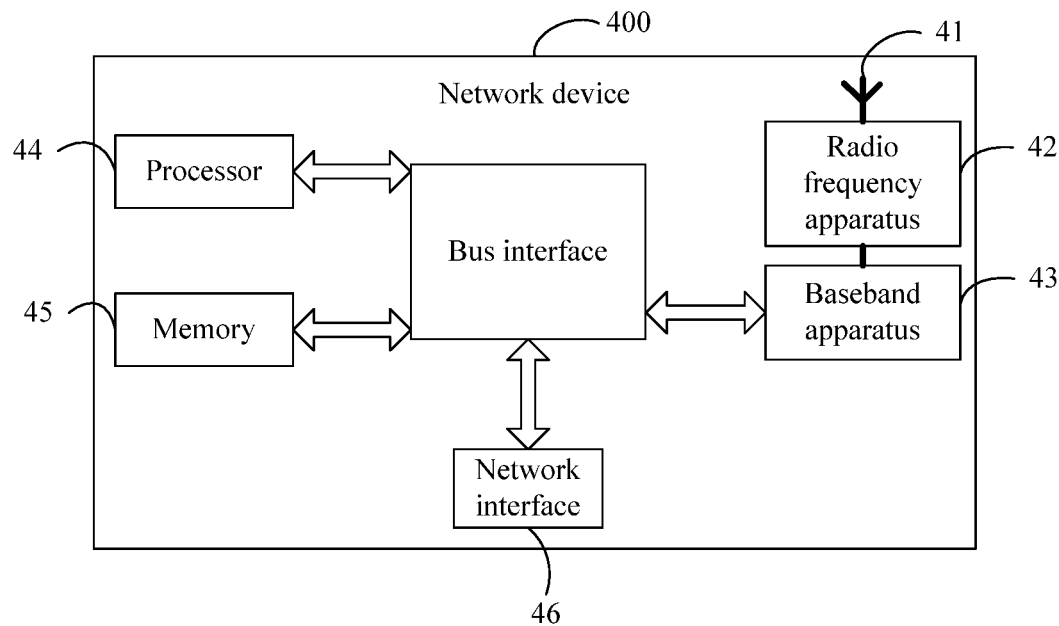
FIG. 4
Receive auxiliary information that satisfies a preset format, where the auxiliary information is used to indicate a first synchronization signal block SSB actually sent by a network device and a second SSB associated with a target physical channel — 51
FIG. 5
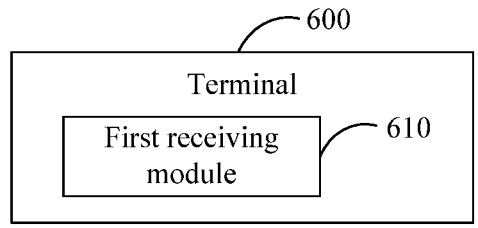
FIG. 6

TRANSMISSION RESOURCE INDICATION METHOD, NETWORK DEVICE, AND TERMINAL

CROSS-REFERENCE TO RELATED APPLICATIONS

This application is a continuation application of International Application No. PCT/CN2019/086128 filed on May 9, 2019, which claims priority to Chinese patent application No. 201810451277.4 filed in China on May 11, 2018, both disclosures of which are incorporated herein by reference in their entireties.

TECHNICAL FIELD

This disclosure relates to the field of communications technologies, and in particular, to a transmission resource indication method, a network device, and a terminal.

BACKGROUND

In a 5th generation (5-th Generation, 5G) mobile communications system, also referred to as a new radio (New Radio, NR) system, a network device needs to send a synchronization signal block (Synchronization Signal and PBCH Block, SSB) for a terminal to perform synchronization, system information acquisition, measurement, and the like. A plurality of SSBs constitute an SSB burst set (SS burst set). The maximum number of SSBs included in one SS burst set depends on carrier frequency used by the system.

When the frequency is less than 3 GHz, one SS burst set can include a maximum of 4 SSBs.

When the carrier frequency is within the range of 3 GHz to 6 GHz, one SS burst set can include a maximum of 8 SSBs.

When the carrier frequency is above 6 GHz, one SS burst set can include a maximum of 64 SSBs.

Regardless of the number of SSBs included in one SS burst set, all the SSBs need to be sent within a 5 ms time window. However, the number of SSBs actually transmitted by a network device within a 5 ms time window may be less than the maximum number of SSBs that can be included in one SS burst set in this frequency band. The network device may notify, through remaining minimum system information (Remaining Minimum System Information, RMSI) and terminal-specific radio resource control (User Equipment specific Radio Resource Control, UE-specific RRC) signaling, a terminal of the actually transmitted SSBs.

In the frequency band above 6 GHz, when the network device uses RMSI to indicate time domain position information of SSBs in one SS burst set, a combination of an 8-bit group bitmap (bitmap) and an 8-bit bitmap in group is used for indication, where an SSB group is defined as a plurality of consecutive SSBs. The group bitmap indicates which SSB groups are actually transmitted (which SSB groups are present), and the bitmap in group indicates which SSBs in these SSB groups are actually transmitted (which SSBs are present in one SSB). As indicated in this indication manner, SSBs that are actually transmitted in each group are the same. For example, one SS burst set can include a maximum of 64 SSBs above 6 GHz, and the 64 possible transmitted SSBs are divided into eight SSB groups. The group bitmap of "11000000" indicates that the network device actually transmits the first and second SSB groups. The bitmap in group of "11110000" indicates that the network device actually transmits the first four SSBs in each of the first and second groups. Therefore, 2×4=8 SSBs are transmitted in total. When the network device uses RRC signaling to notify the terminal of the actually transmitted SSBs, a full bitmap is used. To be specific, when an SS burst set can include a maximum of L SSBs (L=4/8/64), a bitmap of length L is used to indicate which SSBs are actually transmitted.

Because the actually transmitted SSBs indicated by the RMSI and those indicated by the RRC may be different, users in different states may have different understandings of physical channel or signal resource allocation according to different indications of the actually transmitted SSBs. For example, a terminal in an idle state can only receive the RMSI, and the terminal deems that the RMSI indicates the actually transmitted SSBs; a terminal in a connected state can receive both the RMSI and the RRC, and the terminal deems that the RRC indicates the actually transmitted SSBs. If the actually transmitted SSBs indicated by the RMSI and those indicated by the RRC may be inconsistent, the terminal in the idle state and the terminal in the connected state may have different understandings of the actually transmitted SSBs.

Further, in the NR system, there is a particular association relationship between a physical channel or signal, such as a physical random access channel (Physical Random Access Channel, PRACH) resource (or referred to as a PRACH transmission occasion or a PRACH occasion, RO) and an actually transmitted SSB. The correspondence between the SSB and the RO may be one-to-one, one-to-many, or many-to-one. The terminal can determine the association relationship between the SSB and the physical channel or signal resource based on actually transmitted SSBs and configuration of physical resources. The different indications of the actually transmitted SSBs may also lead to different understandings of the relationship between the physical channel or signal and the actually transmitted SSB. This may cause a series of problems such as waste of resources and increased complexity of system resource configuration.

SUMMARY

Embodiments of this disclosure provide a transmission resource indication method, a network device, and a terminal, to solve problems of resource waste and high complexity of system resource configuration due to different understandings of resource allocation by terminals in different states.

According to a first aspect, an embodiment of this disclosure provides a transmission resource indication method, applied to a network device side, where the method includes:

sending auxiliary information that satisfies a preset format, where the auxiliary information is used to indicate a first synchronization signal block SSB that is actually sent and a second SSB associated with a target physical channel.

According to a second aspect, an embodiment of this disclosure further provides a network device, including:

a first sending module, configured to send auxiliary information that satisfies a preset format, where the auxiliary information is used to indicate a first synchronization signal block SSB that is actually sent and a second SSB associated with a target physical channel.

According to a third aspect, an embodiment of this disclosure provides a network device, where the network device includes a processor, a memory, and a program stored in the memory and capable of running on the processor, where when the processor executes the program, the step of the foregoing transmission resource indication method is implemented.

According to a fourth aspect, an embodiment of this disclosure provides a transmission resource indication method, applied to a terminal side, where the method includes:

receiving auxiliary information that satisfies a preset format, where the auxiliary information is used to indicate a first synchronization signal block SSB actually sent by a network device and a second SSB associated with a target physical channel.

According to a fifth aspect, an embodiment of this disclosure provides a terminal, including:

a first receiving module, configured to receive auxiliary information that satisfies a preset format, where the auxiliary information is used to indicate a first synchronization signal block SSB actually sent by a network device and a second SSB associated with a target physical channel.

According to a sixth aspect, an embodiment of this disclosure further provides a terminal, where the terminal includes a processor, a memory, and a program stored in the memory and capable of running on the processor, where when the program is executed by the processor, the step of the foregoing transmission resource indication method is implemented.

According to a seventh aspect, an embodiment of this disclosure provides a computer-readable storage medium, where the computer-readable storage medium stores a program, and when the program is executed by a processor, the step of the foregoing transmission resource indication method on the network device is implemented, or the foregoing transmission resource indication method on the terminal side is implemented.

In this way, the embodiments of this disclosure can ensure that terminals in different states have a consistent understanding of resource allocation, thereby avoiding unwanted resource waste and lowering complexity of system resource configuration.

BRIEF DESCRIPTION OF DRAWINGS

To better clarify the technical solutions in the embodiments of this disclosure, the accompanying drawings for describing the embodiments of this disclosure are briefly described below. Apparently, the accompanying drawings described below merely illustrate some of the embodiments of this disclosure. Persons of ordinary skill in the art can derive other accompanying drawings from these accompanying drawings without creative efforts.

FIG. 1 represents a block diagram of a mobile communications system to which an embodiment of this disclosure can be applied;

FIG. 2 represents a schematic flowchart of a transmission resource indication method on a network device side according to an embodiment of this disclosure;

FIG. 3 represents a schematic diagram of a modular structure of a network device according to an embodiment of this disclosure;

FIG. 4 represents a block diagram of a network device according to an embodiment of this disclosure;

FIG. 5 represents a schematic flowchart of a transmission resource indication method on a terminal side according to an embodiment of this disclosure;

FIG. 6 represents a schematic diagram of a modular structure of a terminal according to an embodiment of this disclosure.

DESCRIPTION OF EMBODIMENTS

Figure 7:
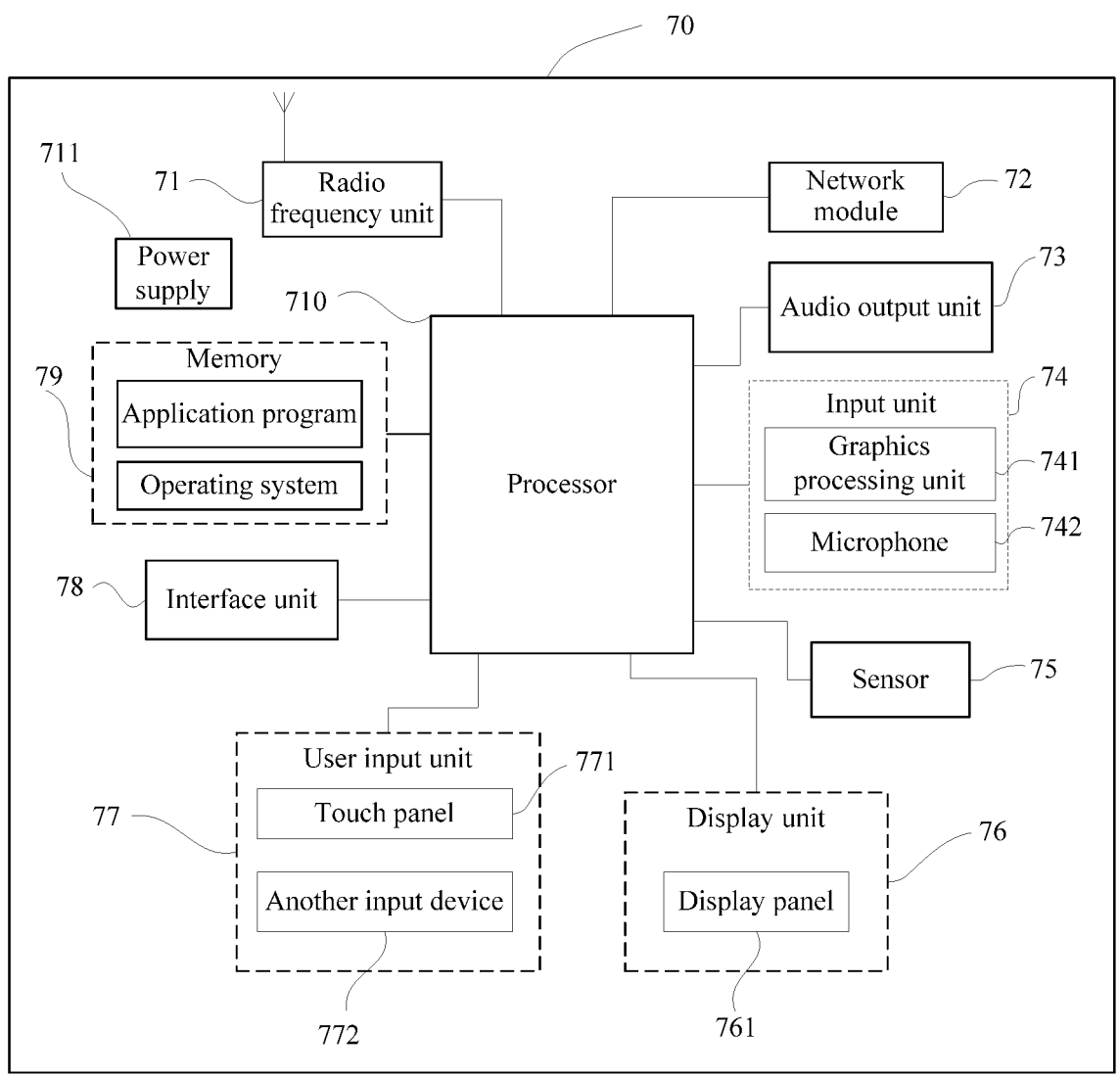
FIG. 7 represents a block diagram of a terminal according to an embodiment of this disclosure.

Exemplary embodiments of this disclosure will be described below in further detail with reference to the accompanying drawings. Although the accompanying drawings show exemplary embodiments of this disclosure, it should be understood that this disclosure may be implemented in various manners and shall not be limited to the embodiments described herein. On the contrary, these embodiments are provided to understand this disclosure more thoroughly and allow a person skilled in the art entirely comprehend the scope of this disclosure.

In the specification and claims of this application, the terms such as "first" and "second" are used for distinguishing similar objects, and are not necessarily used to describe a particular order or sequence. It should be understood that data used in such a way can be used interchangeably in proper situations, so that the embodiments of this disclosure described herein can be implemented in sequences other than those illustrated or depicted herein. In addition, the terms "include" and "have" and any variation thereof are intended to cover a non-exclusive inclusion. For example, processes, methods, systems, products, or devices including a series of steps or units are not necessarily limited to these steps or units listed expressly, but instead may include other steps or units not expressly listed or inherent to these processes, methods, products, or devices. "And/or" used in the specification and claims means at least one of the connected objects.

The technology described herein is not limited to a long time evolution (Long Time Evolution, LTE)/LTE-Advanced (LTE-Advanced, LTE-A) system, and can also be used in various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" are often used interchangeably. The CDMA system can implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system can implement radio technologies such as the global system for mobile communications (Global System for Mobile Communication, GSM). The OFDMA system can implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are part of the universal mobile telecommunications system (Universal Mobile Telecommunications System, UMTS). LTE and more advanced LTE (such as LTE-A) are new UMTS versions that use E-UTRA. UTRA, E-UTRA, UMTS, LTE, LTE-A, and GSM are described in documents from the organization named "3rd generation partnership project (3rd Generation Partnership Project, 3GPP)". CDMA2000 and UMB are described in documents from the organization named "3rd generation partnership project 2 (3rd Generation Partnership Project 2, 3GPP2)". The technology described herein can be used in the foregoing systems and radio technologies as well as other systems and radio technologies. However, an NR system is described in the following description for illustrative purposes, and NR terminology is used in most of the following description, although these technologies can also be applied to applications other than the NR system application.

The following description provides examples and does not limit the scope, applicability, or configuration set forth in the claims. Alterations may be made to functions and arrangements of the discussed elements without departing from the spirit and scope of this disclosure. In various examples, various procedures or components may be omitted, replaced, or added appropriately. For example, the described methods can be performed in a different order than that described, and various steps can be added, omitted, or combined. In addition, features described with reference to some examples may be combined in other examples.

Referring to FIG. 1, FIG. 1 shows a block diagram of a wireless communications system to which an embodiment of this disclosure can be applied. The wireless communications system includes a terminal 11 and a network device 12. The terminal 11 may be also referred to as a terminal device or a user terminal (User Equipment, UE). The terminal 11 may be a terminal-side device such as a mobile phone, a tablet computer (Tablet Personal Computer), a laptop computer (Laptop Computer), a personal digital assistant (Personal Digital Assistant, PDA), a mobile Internet device (Mobile Internet Device, MID), a wearable device (Wearable Device), or a vehicle-mounted device. It should be noted that a specific type of the terminal 11 is not limited in the embodiments of this disclosure. The network device 12 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in the embodiments of this disclosure, the base station in the NR system is merely used as an example, but does not limit a specific type of the base station.

The base station can communicate with the terminal 11 under the control of a base station controller. In various examples, the base station controller may be a part of the core network or some base stations. Some base stations can communicate control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit modulated signals on these plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can communicate wirelessly with the terminal 11 via one or more access point antennas. Each base station can provide communication coverage for its corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access network or operator deployment. Coverage areas of different base stations (including coverage areas of base stations of the same or different types, coverage areas of base stations using the same or different radio technologies, or coverage areas belonging to the same or different access networks) may overlap.

The communication link in the wireless communications system may include an uplink for carrying uplink (Uplink, UL) transmission (for example, from the terminal 11 to the network device 12), or a downlink for carrying downlink (Downlink, DL) transmission (for example, from the network device 12 to the terminal 11). The UL transmission may also be referred to as reverse link transmission, and the DL transmission may also be referred to as forward link transmission. The downlink transmission may be performed over a licensed frequency band, an unlicensed frequency band, or the both. Similarly, the uplink transmission may be performed over a licensed frequency band, an unlicensed frequency band, or the both.

It should be additionally noted that, transmission mentioned in the embodiments of this disclosure includes not only uplink transmission but also downlink transmission, a transmission location includes not only an uplink transmission location but also a downlink transmission location, and a transmission resource includes not only an uplink transmission resource but also a downlink transmission resource. In addition, the transmission resource includes but is not limited to time domain, frequency domain, spatial domain, code domain, or the like.

The embodiments of this disclosure provide a transmission resource indication method, which is applied to a network device side. The method may include: sending auxiliary information to a terminal, where the auxiliary information is used to indicate a first object that determines resource allocation and a second object associated with a target physical channel. The first object and the second object mentioned herein may be a downlink channel or downlink signal used for measurement, such as a synchronization signal block SSB, a channel state information reference signal (Channel State Information Reference Signal, CSI-RS), a sounding reference signal (Sounding Reference Signal, SRS), or a phase tracking reference signal (Phase Tracking Reference Signal, PTRS). The SSB is used as merely an example for description in the embodiments, and a resource allocation status may be indicated to the terminal by using other signals in a similar manner.

As shown in FIG. 2, the method may include the following step:

Step 21: Send auxiliary information that satisfies a preset format, where the auxiliary information is used to indicate a first synchronization signal block SSB that is actually sent and a second SSB associated with a target physical channel.

The first SSB and the second SSB mentioned herein may be the same or different, which is not specifically limited herein. The preset format may be a signaling format, an encapsulation format, an encoding format, or the like that is predefined in a protocol. The target physical channel may also be referred to as a target physical resource, a target physical signal, a target monitoring occasion, a target search space, or other particular technical vocabulary. The "associated" mentioned herein refers to a correspondence between the second SSB and the target physical channel. For example, when the target physical channel is a PRACH resource RO that transmits msg1, there is a correspondence between the second SSB and the RO, and the terminal can select, based on the second SSB, an RO on which random access can be initiated; or when the target physical channel is a search space for a PDCCH, there may be a correspondence between a start location of the search space and the second SSB, and the terminal can determine the start location of the search space for the PDCCH based on the second SSB. The auxiliary information is used to indicate an actual resource allocation status for a terminal, so that terminals in different states have a consistent understanding of resource allocation, thereby avoiding unwanted resource waste.

The foregoing auxiliary information may be carried in RRC or RMSI, and a specific information format of the auxiliary information may include but not limited to the following several implementations:

Manner 1: The auxiliary information includes first indication information and second indication information, where the first indication information is used to help the terminal determine resource allocation, for example, the first indication information is used to indicate the first SSB; and the second indication information is used to help the terminal determine an association relationship between the target physical channel and the resource allocation, for example, the second indication information is used to indicate the second SSB associated with the target physical channel. A format of the first indication information may be the same as or different from a format of the second indication information.

The number of bits included in the first indication information may be: 4, 8, 16, 64, or 80. For example, when the first indication information satisfies the preset format, the first indication information may satisfy one of the following formats: a 4-bit bitmap, an 8-bit bitmap, two 8-bit bitmaps, a 16-bit bitmap, a 64-bit bitmap, one 64-bit bitmap and one 16-bit bitmap, a 64-bit bitmap, one 64-bit bitmap and two 8-bit bitmaps, one 80-bit bitmap, and the like. Similarly, the number of bits included in the second indication information may also be: 4, 8, 16, 64, or 80. When the second indication information satisfies the preset format, the second indication information may satisfy one of the following formats: a 4-bit bitmap, an 8-bit bitmap, two 8-bit bitmaps, a 16-bit bitmap, a 64-bit bitmap, one 64-bit bitmap and one 16-bit bitmap, one 64-bit bitmap and two 8-bit bitmaps, one 80-bit bitmap, and the like. It should be noted that the number of bits included in the first indication information and that of bits included in the second indication information may be the same or different. When the first indication information or the second indication information is two 8-bit bitmaps, one of the 8-bit bitmaps is used to indicate which SSB groups are present, and the other 8-bit bitmap is used to indicate which SSBs in one group are present. When the first indication information or the second indication information is a 16-bit bitmap, 8 bits in the 16 bits are used to indicate which SSB groups are present, and the other 8 bits are used to indicate which SSBs in one group are present.

If the first indication information and the second indication information are both carried in at least one piece of RRC or RMSI, or if the first indication information and the second indication information are carried in the RRC and the RMSI respectively, the first indication information is one 4-bit bitmap in the case of below 3 GHz; the first indication information is one 8-bit bitmap in the case of 3 GHz to 6 GHz; and the first indication information is one 64-bit bitmap in the case of above 6 GHz. The second indication information may be one 8-bit bitmap in the case of below 6 GHz; and the second indication information may be two 8-bit bitmaps in the case of above 6 GHz, where one of the 8-bit bitmaps is used to indicate which SSB groups are present, and the other 8-bit bitmap is used to indicate which SSBs in one group are present. Implementation of the information element (Information Element, IE) or parameter field (field) design thereof may refer to, but is not limited to, the following manner:

```
ssb-PositionsInBurst            CHOICE {
    -- bitmap for sub 3 GHz
    shortBitmap                 BIT STRING (SIZE (4)),
    -- bitmap for 3-6 GHz
    mediumBitmap                BIT STRING (SIZE (8)),
    -- bitmap for above 6 GHz
    longBitmap                  BIT STRING (SIZE (64))
},
ssb-PositionsInBurst 2          SEQUENCE {
    -- Indicates the presence of the up to 8 SSBs in one group
    inOneGroup                  BIT STRING (SIZE (8)),
    -- For above 6 GHz: indicates which groups of SSBs is present
    groupPresence               BIT STRING (SIZE (8))
        OPTIONAL -- Cond above6GHzOnly
}
```

The ssb-PositionsInBurst field in the above IE design is the first indication information, and the ssb-PositionsInBurst2 field is the second indication information.

In addition to the foregoing case in which the first indication information and the second indication information are included, the auxiliary information may indicate a resource allocation status with reference to the following manner.

Manner 2: The auxiliary information includes third indication information, where the third indication information is used to help the terminal determine resource allocation and determine an association relationship between the target physical channel and the resource allocation. For example, the third indication information is used to indicate the actually transmitted first SSB and the second SSB associated with the target physical channel. The third indication information may directly indicate the actually transmitted first SSB. The second SSB may be the same as or different from the first SSB, or the second SSB may be the maximum number of SSBs that can be included in each SS burst set in the current operating frequency band. The third indication information may include one indication field or two indication fields. When the third indication information includes one indication field, the indication field indicates both the first SSB and the second SSB. When the third indication information includes two indication fields, one of the indication fields indicates the first SSB, and the other indication field indicates the second SSB. The one indication field may include one or more parameters.

The third indication information is similar to the first indication information or the second indication information. The number of bits included in the third indication information may be: 4, 8, 16, 64, 80, or the like. For example, the third indication information may also be a third indication bitmap that satisfies the preset format, and the third indication bitmap includes: a 4-bit bitmap, an 8-bit bitmap, two 8-bit bitmaps, a 16-bit bitmap, a 64-bit bitmap, one 64-bit bitmap and one 16-bit bitmap, one 64-bit bitmap and two 8-bit bitmaps, one 80-bit bitmap, or the like.

If the RMSI carries the third indication information, that is, the auxiliary information is information, in the RMSI, indicating SSBs, the third indication information may be one 4-bit bitmap in the case of below 3 GHz; the third indication information is one 8-bit bitmap in the case of 3 GHz to 6 GHz; and the third indication information is one 64-bit bitmap in the case of above 6 GHz. The IE design thereof may refer to, but is not limited to, the following manner:

```
ssb-PositionsInBurst      CHOICE {
    -- bitmap for sub 3 GHz
    shortBitmap           BIT STRING (SIZE (4)),
    -- bitmap for 3-6 GHz
    mediumBitmap          BIT STRING (SIZE (8)),
    -- bitmap for above 6 GHz
    longBitmap            BIT STRING (SIZE (64))
}
```

For another example, if the RRC carries the third indication information, the third indication information may be one 8-bit bitmap in the case of below 6 GHz; and the third indication information may be two 8-bit bitmaps in the case of above 6 GHz. One of the 8-bit bitmaps is used to indicate which SSB groups are present, and the other 8-bit bitmap is used to indicate which SSBs in one group are present. Implementation of the IE design thereof may refer to, but is not limited to, the following manner:

```
ssb-PositionsInBurst       SEQUENCE {
    -- Indicates the presence of the up to 8 SSBs in one group
    inOneGroup             BIT STRING (SIZE (8)),
    -- For above 6 GHz: indicates which groups of SSBs is present
    groupPresence          BIT STRING (SIZE (8))
            OPTIONAL -- Cond above6GHzOnly
}
```

For another example, the third indication information may be one 4-bit bitmap in the case of below 3 GHz; the third indication information is one 8-bit bitmap in the case of 3 GHz to 6 GHz; and the third indication information is one 80-bit bitmap in the case of above 6 GHz. When the third indication information is one 80-bit bitmap in the case of above 6 GHz, 8 bits in the bitmap are used to indicate which SSB groups are present, and the other 8 bits are used to indicate which SSBs in one group are present. These two 8 bits are used to indicate the second SSB. The remaining 64 bits are used to indicate the first SSB. Implementation of the IE design thereof may refer to, but is not limited to, the following manner:

```
ssb-PositionsInBurst      CHOICE {
    -- bitmap for sub 3 GHz
    shortBitmap           BIT STRING (SIZE (4)),
    -- bitmap for 3-6 GHz
    mediumBitmap          BIT STRING (SIZE (8)),
    -- bitmap for above 6 GHz
    longBitmap            BIT STRING (SIZE (80))
}
```

One explanation of the above IE design is that in the case of above 6 GHz, when the third indication information is longBitmap, the highest 8 bits are used to indicate which SSB groups are present, and 8 bits following the highest 8 bits are used to indicate which SSBs in one group are present. In other words, the highest 16 bits indicate the second SSB, and the low 64 bits indicate the first SSB. In the case of below 6 GHz, when the third indication information is a short bitmap shortBitmap (for example, a 4-bit bitmap for below 3 GHz or an 8-bit bitmap for 3 GHz to 6 GHz), the SSB indicated by the IE is the first SSB, and the second SSB is the same as the first SSB.

For another example, the third indication information may be one 8-bit bitmap in the case of below 6 GHz; and the third indication information may be one 80-bit bitmap in the case of above 6 GHz. When the third indication information is one 8-bit bitmap, the 8-bit bitmap is used to indicate which SSBs are present. When the third indication information is an 80-bit bitmap, 8 bits in the bitmap are used to indicate which SSB groups are present, and the other 8 bits are used to indicate which SSBs in one group are present. The remaining 64 bits are used to indicate the first SSB. Implementation of the IE design thereof may refer to, but is not limited to, the following manner:

```
ssb-PositionsInBurst    CHOICE {
    -- bitmap for below 6 GHz
    shortBitmap         BIT STRING (SIZE (8)),
    -- bitmap for above 6 GHz
    longBitmap          BIT STRING (SIZE (80))
}
```

One explanation of the above IE design is that in the case of above 6 GHz, when the third indication information is longBitmap, the highest 8 bits are used to indicate which SSB groups are present, and 8 bits following the highest 8 bits are used to indicate which SSBs in one group are present. In other words, the highest 16 bits indicate the second SSB, and the low 64 bits indicate the first SSB. In the case of below 6 GHz, when the third indication information is a short bitmap shortBitmap (for example, 8 bits), the SSB indicated by the IE is the first SSB, and the second SSB is the same as the first SSB.

In the above three manners, the third indication information includes only one indication field, and the indication field indicates both the first SSB and the second SSB. In addition to the foregoing implementations, encoding of the third indication information may further be implemented in the following manners:

For example, the third indication information is one 4-bit bitmap in the case of below 3 GHz; the third indication information is one 8-bit bitmap in the case of 3 GHz to 6 GHz; and the third indication information includes one 64-bit bitmap (also referred to as a first long bitmap) and one piece of 16-bit information in the case of above 6 GHz, where the 16-bit information includes two 8-bit bitmaps (also referred to as second long bitmaps). Implementation of the IE design thereof may refer to, but is not limited to, the following manner:

```
ssb-PositionsInBurst       CHOICE {
    -- bitmap for sub 3 GHz
    shortBitmap            BIT STRING (SIZE (4)),
    -- bitmap for 3-6 GHz
    mediumBitmap           BIT STRING (SIZE (8)),
    -- for above 6 GHz
    above6GSSBIndicator    SEQUENCE {
    longBitmap             BIT STRING (SIZE (64))
        OPTIONAL,
    longBitmap2            SEQUENCE {
        inOneGroup         BIT STRING (SIZE (8)),
        groupPresence      BIT STRING (SIZE (8))
        }                  OPTIONAL
    }
}
```

The ssb-PositionsInBurst field in the above IE design is the third indication information, and in the case of above 6 GHz, the ssb-PositionsInBurst field may include at least one of longBitmap and longBitmap2. The longBitmap includes one 64-bit bitmap, and the longBitmap2 includes two 8-bit bitmaps: inOneGroup and groupPresence.

For another example, the third indication information is one 4-bit bitmap in the case of below 3 GHz; the third indication information is one 8-bit bitmap in the case of 3 GHz to 6 GHz; and the third indication information includes at least one of one 64-bit bitmap (also referred to as a first long bitmap) and one 16-bit bitmap (also referred to as a third long bitmap) in the case of above 6 GHz. Implementation of the IE design thereof may refer to, but is not limited to, the following manner:

```
ssb-PositionsInBurst          CHOICE {
    -- bitmap for sub 3 GHz
    shortBitmap               BIT STRING (SIZE (4)),
    -- bitmap for 3-6 GHz
    mediumBitmap              BIT STRING (SIZE (8)),
    -- for above 6 GHz
    above6GSSBIndicator              SEQUENCE {
    longBitmap                BIT STRING (SIZE (64))
        OPTIONAL,
    -- Indicates the presence of the up to 8 SSBs in one group and which groups of SSBs is present
        inOneGroupAndgroupPresence        BIT STRING (SIZE (16))
            OPTIONAL
    }
}
```

The ssb-PositionsInBurst field in the above IE design is the third indication information, and in the case of above 6 GHz, the ssb-PositionsInBurst field may include at least one of longBitmap in the one 64-bit bitmap and inOneGroupAndgroupPresence in the one 16-bit bitmap.

For another example, the third indication information is a 4-bit bitmap in the case of below 3 GHz; the third indication information is one 8-bit bitmap in the case of 3 GHz to 6 GHz; and the third indication information may include only one 64-bit bitmap, or include not only one 64-bit bitmap but also two 8-bit bitmaps in the case of above 6 GHz. Implementation thereof may refer to, but is not limited to, the following manners:

First:

```
ssb-PositionsInBurst          CHOICE {
    -- bitmap for sub 3 GHz
    shortBitmap               BIT STRING (SIZE (4)),
    -- bitmap for 3-6 GHz
    mediumBitmap              BIT STRING (SIZE (8)),
    -- bitmap for above 6 GHz
    longBitmap                BIT STRING (SIZE (64)),
    -- for above 6 GHz
    above6GSSBIndicator       SEQUENCE {
        inOneGroup            BIT STRING (SIZE (8)),
        groupPresence         BIT STRING (SIZE (8)),
        longBitmap2           BIT STRING (SIZE (64))
    }
}
```

The ssb-PositionsInBurst field in the above IE design is the third indication information, and in the case of above 6 GHz, the ssb-PositionsInBurst field includes longBitmap or above6GSSBIndicator. The above6GSSBIndicator includes one 64-bit bitmap longBitmap2 and two 8-bit bitmaps: inOneGroup and groupPresence.

Second:

```
ssb-PositionsInBurst          CHOICE {
    -- bitmap for sub 3 GHz
    shortBitmap               BIT STRING (SIZE (4)),
    -- bitmap for 3-6 GHz
    mediumBitmap              BIT STRING (SIZE (8)),
    -- for above 6 GHz
```

-continued

```
    longBitmap                CHOICE {
        longBitmap1           BIT STRING (SIZE (64)),
        above6GSSBIndicator   SEQUENCE {
            inOneGroup        BIT STRING (SIZE (8)),
            groupPresence     BIT STRING (SIZE (8)),
            longBitmap2       BIT STRING (SIZE (64))
        }
    }
}
```

The ssb-PositionsInBurst field in the above IE design is the third indication information, and in the case of above 6 GHz, the ssb-PositionsInBurst field includes longBitmap. The longBitmap includes longBitmap1 or above6GSSBIndicator. The above6GSSBIndicator includes one 64-bit bitmap longBitmap2 and two 8-bit bitmaps: inOneGroup and groupPresence.

For another example, the third indication information is a 4-bit bitmap in the case of below 3 GHz; the third indication information is an 8-bit bitmap in the case of 3 GHz to 6 GHz; and the third indication information may include only one 64-bit bitmap, or include not only one 64-bit bitmap but also one 16-bit bitmap in the case of above 6 GHz. Implementation thereof may refer to, but is not limited to, the following manners:

First:

```
ssb-PositionsInBurst          CHOICE {
    -- bitmap for sub 3 GHz
    shortBitmap               BIT STRING (SIZE (4)),
    -- bitmap for 3-6 GHz
    mediumBitmap              BIT STRING (SIZE (8)),
    -- bitmap for above 6 GHz
```

```
    longBitmap                              BIT STRING (SIZE (64)),
    -- for above 6 GHz
        above6GSSBIndicator                 SEQUENCE {
        -- Indicates the presence of the up to 8 SSBs in one group and which
groups of SSBs is present
            inOneGroupAndgroupPresence      BIT STRING (SIZE (16)),
            longBitmap2                     BIT STRING (SIZE (64))
        }
}
```

The ssb-PositionsInBurst field in the above IE design is the third indication information, and in the case of above 6 GHz, the ssb-PositionsInBurst field includes longBitmap or above6GSSBIndicator. The above6GSSBIndicator includes one 64-bit bitmap longBitmap2 and one 16-bit bitmap inOneGroupAndgroupPresence.

Second:

```
    ssb-PositionsInBurst                    CHOICE {
        -- bitmap for sub 3 GHz
        shortBitmap                         BIT STRING (SIZE (4)),
        -- bitmap for 3-6 GHz
        mediumBitmap                        BIT STRING (SIZE (8)),
        -- for above 6 GHz
        longBitmap CHOICE {
            longBitmap 1                    BIT STRING (SIZE (64)),
            above6GSSBIndicator             SEQUENCE {
            -- Indicates the presence of the up to 8 SSBs in one group and which
groups of SSBs is present
                inOneGroupAndgroupPresence  BIT STRING (SIZE (16)),
                longBitmap2                 BIT STRING (SIZE (64))
            }
        }
    }
}
```

The ssb-PositionsInBurst field in the above IE design is the third indication information, and in the case of above 6 GHz, the ssb-PositionsInBurst field includes longBitmap. The longBitmap includes longBitmap1 or above6GSSBIndicator. The above6GSSBIndicator includes one 64-bit bitmap longBitmap2 and one 16-bit bitmap inOneGroupAndgroupPresence.

In the above six manners (one IE design corresponds to one implementation), the third indication information includes two indication fields, of which one indication field (for example, the above 64-bit bitmap) is used to indicate the first SSB, and the other indication field (for example, the above two 8-bit bitmaps or one 16-bit bitmap) is used to indicate the second SSB, or vice versa.

It should be noted that the implementations of the above example IE designs are merely used as possible examples of the auxiliary information IE design implementation, and other encoding methods that can implement the auxiliary information function can also be applied to the embodiments of this disclosure, and are not listed one by one in the embodiments of this disclosure. In addition, regardless of the foregoing manner 1 or manner 2, when the first SSB is null, the user can determine an SSB resource based on the maximum number L of SSBs sent in the next SS burst set in the current frequency band; or when the second SSB is null, the user can determine an SSB association relationship based on the maximum number L of SSBs sent in the next SS burst set in the current frequency band.

In addition, the number and types of pieces of indication information included in the auxiliary information may be related to the operating frequency band. For example: in the scenario of below 6 GHz, the auxiliary information includes only one piece of indication information (for example, the third indication information), and in the scenario of above 6 GHz, the auxiliary information includes the first indication information and the second indication information. Alternatively, in the scenario of below 6 GHz, the auxiliary information includes the first indication information and the second indication information, and in the scenario of above 6 GHz, the auxiliary information includes only one piece of indication information (for example, the third indication information).

Still alternatively, the number and types of pieces of indication information included in the auxiliary information may be unrelated to the operating frequency band. Regardless of the scenario of below 6 GHz or the scenario of above 6 GHz, the auxiliary information includes the first indication information and the second indication information; or the auxiliary information includes only one piece of indication information (for example, the third indication information).

Transmission resource indication manners are further described in the following embodiments of this disclosure with reference to different application scenarios.

Scenario 1: When a terminal performs a cell handover, first auxiliary information for a target cell is sent.

In this scenario, when the terminal performs the cell handover, a base station sends the first auxiliary information for the target cell to the terminal, where the first auxiliary information is used to indicate a first synchronization signal block SSB that is actually sent and a second SSB associated with a target physical channel.

It is assumed that in this scenario, the auxiliary information includes first indication information and second indication information, and the first auxiliary information is auxiliary information for all BWPs configured for the terminal on the target cell. For example, when the terminal performs a cell handover, the base station configures auxiliary information for all DL BWPs, with presence SSBs, that are configured for the terminal on the target cell. When the auxiliary information includes the first indication information and the second indication information, the terminal considers that an SSB indicated by the first indication information corresponding to a DL BWP with presence of an SSB is an SSB actually sent in each SS burst set on the DL BWP, and the terminal does not receive other signals or channels on these SSB resources. Further, if there is a PRACH resource on an UL BWP corresponding to a DL BWP with presence of an SSB, the terminal considers that there is an association relationship between an SSB indicated by the second indication information corresponding to a DL BWP and an RO on the UL BWP, with presence of the PRACH resource, corresponding to the DL BWP. The terminal determines the association relationship between the RO on the UL BWP configured for the user on the target cell and the SSB based on the second indication information corresponding to the DL BWP and PRACH configuration of the target cell.

Alternatively, it is assumed that in this scenario, the auxiliary information includes first indication information and second indication information, and the first auxiliary information is auxiliary information for an initial active (initial Active) BWP configured for the terminal on the target cell. For example, when the terminal performs a cell handover, the base station configures auxiliary information for an initial active DL BWP on the target cell. When the auxiliary information includes the first indication information and the second indication information, the terminal considers that the first indication information indicates an SSB actually sent in each SS burst set on the initial active DL BWP on the target cell, and the terminal does not receive other signals or channels on these SSB resources. Further, the terminal considers that there is an association relationship between an SSB indicated by the second indication information and an RO on an initial active UL BWP on the target cell. The terminal determines the association relationship between the RO on the initial active UL BWP on the target cell and the SSB based on the second indication information and PRACH configuration of the target cell. Alternatively, when the terminal performs a cell handover, the base station configures auxiliary information for an initial active DL BWP on the target cell. When the auxiliary information includes the first indication information and the second indication information, the terminal considers that the first indication information indicates an SSB actually sent in each SS burst set on the initial active DL BWP on the target cell, and the terminal does not receive other signals or channels on these SSB resources. However, the terminal considers that there is an association relationship between an SSB indicated by the second indication information and ROs on all UL BWPs, with presence of the PRACH resources, that are configured for the terminal on the target cell. The terminal determines the association relationship between the ROs on all the UL BWPs, with presence of the PRACH resources, that are configured for the terminal on the target cell and the SSB based on the second indication information and PRACH configuration of the target cell.

Alternatively, it is assumed that in this scenario, the auxiliary information includes third indication information, and the first auxiliary information is auxiliary information for all BWPs configured for the terminal on the target cell. For example, when the terminal performs a cell handover, the base station configures auxiliary information for all DL BWPs, with presence SSBs, that are configured for the terminal on the target cell. When the auxiliary information includes only the third indication information, the terminal considers that a first SSB indicated by the third indication information corresponding to a DL BWP with presence of an SSB is an SSB actually sent in each SS burst set on the DL BWP, and the terminal does not receive other signals or channels on these SSB resources. Further, if there is a PRACH resource on an UL BWP corresponding to a DL BWP with presence of an SSB, the terminal considers that there is an association relationship between a second SSB indicated by the third indication information corresponding to a DL BWP and an RO on the UL BWP, with presence of the PRACH resource, corresponding to the DL BWP. The terminal determines the association relationship between the RO on the UL BWP configured for the user on the target cell and the SSB based on the third indication information corresponding to the DL BWP and PRACH configuration of the target cell.

Alternatively, it is assumed that in this scenario, the auxiliary information includes third indication information, and the first auxiliary information is auxiliary information for an initial active (initial Active) BWP configured for the terminal on the target cell. For example, when the terminal performs a cell handover, the base station configures auxiliary information for an initial active DL BWP on the target cell. When the auxiliary information includes the third indication information, the terminal considers that a first SSB indicated by the third indication information is an SSB actually sent in each SS burst set on the initial active DL BWP on the target cell, and the terminal does not receive other signals or channels on these SSB resources. Further, the terminal considers that there is an association relationship between a second SSB indicated by the third indication information and an RO on an initial active UL BWP on the target cell. The terminal determines the association relationship between the RO on the initial active UL BWP on the target cell and the SSB based on the third indication information and PRACH configuration of the target cell. Alternatively, when the terminal performs a cell handover, the base station configures auxiliary information for an initial active DL BWP on the target cell. When the auxiliary information includes only the third indication information, the terminal considers that a first SSB indicated by the third indication information is an SSB actually sent in each SS burst set on the initial active DL BWP on the target cell, and the terminal does not receive other signals or channels on these SSB resources. However, the terminal considers that there is an association relationship between a second SSB indicated by the third indication information and ROs on all UL BWPs, with presence of the PRACH resources, that are configured for the terminal on the target cell. The terminal determines the association relationship between the ROs on all the UL BWPs, with presence of the PRACH resources, that are configured for the terminal on the target cell and the SSB based on the third indication information and PRACH configuration of the target cell.

In addition, it should be noted that when the auxiliary information includes only the third indication information, and the auxiliary information is two 8-bit bitmaps, carried in the RMSI, indicating SSB information or a 64-bit bitmap, carried in the RRC, indicating SSB information, the first auxiliary information may be auxiliary information for an initial active BWP configured for the terminal on the target cell. For example, when the terminal performs a cell handover, the base station configures auxiliary information for an initial active DL BWP on the target cell. When the auxiliary information includes only the third indication information, the terminal considers that the third indication information indicates an SSB actually sent in each SS burst set on the initial active DL BWP on the target cell, and the terminal does not receive other signals or channels on these SSB resources. Assuming that a maximum of L SSBs are sent within the next SS burst set in the current frequency band, the terminal considers that there is an association relationship between the L SSBs and ROs on the target cell, and the terminal determines the association relationship between the target cell ROs and the L SSBs based on L and PRACH configuration of the target cell.

Scenario 2: When a secondary cell is added or configuration of a secondary cell is modified for the terminal, second auxiliary information for the secondary cell is sent.

In this scenario, when a secondary cell (Secondary Cell, Scell) for the terminal is added or Scell configuration is modified, the base station sends second auxiliary information for the Scell to the terminal, where the second auxiliary information is used to indicate a first SSB actually sent by the Scell and a second SSB associated with a target physical channel.

It is assumed that in this scenario, the auxiliary information includes first indication information and second indication information, and the second auxiliary information is auxiliary information for the first active (first Active) BWP configured for the terminal on the Scell. For example, when adding an Scell for the terminal, the base station configures auxiliary information for the first active downlink BWP on the Scell. When the auxiliary information includes the first indication information and the second indication information, the terminal considers that an SSB indicated by the first indication information is an SSB actually sent in each SS burst set on the first active downlink BWP on the Scell, and the terminal does not receive other signals or channels on these SSB resources. The terminal considers that there is an association relationship between an SSB indicated by the second indication information and an RO on the Scell. The terminal determines the association relationship between the RO on the Scell and the SSB based on the second indication information and PRACH configuration information of the Scell. The RO on the SCell described herein may be an RO on an UL BWP with presence of a PRACH resource in the SCell, or may be ROs on all UL BWPs with presence of PRACH resources in the Scell.

In addition, when the base station modifies the Scell configuration for the terminal, the second auxiliary information may also be sent with reference to the foregoing manner. That the second auxiliary information includes the third indication information is also applicable to various embodiments of third scenario, and therefore details are not repeated herein.

Scenario 3: When a primary secondary cell is added or configuration of a primary secondary cell is modified for the terminal, third auxiliary information for the primary secondary cell is sent.

In this scenario, when the base station adds a primary secondary cell (Primary Secondary Cell, PScell) for the terminal or modifies PScell configuration, the base station sends third auxiliary information for the PScell to the terminal, where the third auxiliary information is used to indicate a first SSB actually sent by the PScell and a second SSB associated with a target physical channel.

It is assumed that in this scenario, the auxiliary information includes first indication information and second indication information, and the third auxiliary information is auxiliary information for an initial active (initial Active) BWP configured for the terminal on the PScell. For example, in a dual connectivity scenario, the base station configures auxiliary information for an initial active DL BWP on a PScell in a secondary cell group (Secondary Cell Group, SCG). When the auxiliary information includes the first indication information and the second indication information, the terminal considers that an SSB indicated by the first indication information is an SSB actually sent in each SS burst set on the initial active DL BWP on the PScell, and the terminal does not receive other signals or channels on these SSB resources. The terminal considers that there is an association relationship between an SSB indicated by the second indication information and an RO on the PScell. The terminal determines the association relationship between the RO on the PScell and the SSB based on the second indication information and PRACH configuration information of the PScell. The RO on the PSCell described herein may be an RO on an UL BWP with presence of a PRACH resource in the PSCell, or may be ROs on all UL BWPs with presence of PRACH resources in the PScell.

In addition, when the base station modifies the PScell configuration for the terminal, the third auxiliary information may also be sent with reference to the foregoing manner. That the third auxiliary information includes the third indication information is also applicable to various embodiments of third scenario, and therefore details are not repeated herein.

Scenario 4: When a bandwidth part is added or configuration of a bandwidth part is modified for the terminal, fourth auxiliary information for the bandwidth part is sent.

In this scenario, when the base station adds a BWP for the terminal or modifies BWP configuration, the base station sends fourth auxiliary information for the BWP to the terminal, where the fourth auxiliary information is used to indicate a first SSB actually sent on the BWP and a second SSB associated with a target physical channel.

It is assumed that in this scenario, the auxiliary information includes first indication information and second indication information, and the fourth auxiliary information is auxiliary information for the BWP configured for the terminal. For example, when the base station adds a DL BWP for the terminal, the base station configures auxiliary information for the DL BWP. When the auxiliary information includes the first indication information and the second indication information, the terminal considers that an SSB indicated by the first indication information is an SSB actually sent in each SS burst set on the DL BWP, and the terminal does not receive other signals or channels on these SSB resources. The terminal considers that there is an association relationship between an SSB indicated by the second indication information and an RO on an UL BWP, with presence of a PRACH resource, corresponding to the DL BWP. The terminal determines the association relationship between the RO on the UL BWP and the SSB based on the second indication information and PRACH configuration information.

In addition, when the base station modifies the BWP configuration for the terminal, the fourth auxiliary information may also be sent with reference to the foregoing manner. That the fourth auxiliary information includes the third indication information is also applicable to various embodiments of third scenario, and therefore details are not repeated herein.

It should be noted that in the foregoing scenario 1, scenario 2, scenario 3, and scenario 4, the auxiliary information configured by the network device may one-to-one correspond to each BWP for the terminal, or correspond to all BWPs for the terminal. In other words, the auxiliary information may include auxiliary information for all BWPs configured for the terminal by the target cell, Scell, or PScell, that is, the base station configures auxiliary information for each BWP. Alternatively, the auxiliary information may include only auxiliary information for one BWP (such as an initial active DL BWP, a first active DL BWP, or a default active DL BWP) configured by the target cell, Scell, or PScell for the terminal, that is, the base station configures auxiliary information for a specific BWP. In this scenario, the terminal considers that auxiliary information for other BWPs is consistent with that for the BWP configured with the auxiliary information, that is, the auxiliary information is common to a plurality of BWPs. For example, in the scenario in which the base station adds a DL BWP for the terminal, if the base station does not configure auxiliary information for the DL BWP, the terminal considers that an SSB actually sent in each SS burst set on the DL BWP is the same as an SSB actually sent in each SS burst set on the initial active DL BWP, and the terminal does not receive other signals or channels on these SSB resources. The terminal considers that there is an association relationship between these actually sent SSBs and an RO on a serving cell to which the DL BWP belongs. The terminal determines the association relationship between the RO on the serving cell and the SSB based on PRACH configuration information.

In an embodiment of this disclosure, the transmission resource indication method further includes: allocating a target transmission resource for the first SSB; and sending the first SSB over the target transmission resource. This step may be performed before step 21 or after step 22, and a specific time sequence between the steps is not limited in this embodiment of this disclosure.

In an embodiment of this disclosure, the transmission resource indication method further includes: sending configuration information for the target physical channel. It should be noted that the foregoing target physical channel includes but is not limited to: a transmission channel corresponding to a random access message, a transmission channel corresponding to other system information (Other System Information, OSI), a transmission channel corresponding to a paging (Paging) message, a control channel corresponding to the random access message, a control channel corresponding to the other system information, and a control channel corresponding to the paging message, where the random access message includes a message 1 (message 1, msg1) and a message 2 (message 2, msg2), a message 3 (message 3, msg3), or a message 4 (message 4, msg4).

According to the foregoing solution, the embodiments of this disclosure can ensure that terminals in different states have a consistent understanding of resource allocation, thereby avoiding unwanted resource waste and lowering complexity of system resource configuration.

The foregoing embodiments describe in detail the transmission resource indication methods in different scenarios. The following embodiments further describe the corresponding network device with reference to the accompanying drawings.

As shown in FIG. 3, a network device 300 in this embodiment of this disclosure can implement details of the method for sending auxiliary information that satisfies a preset format in the forgoing embodiments and achieve the same effects, where the auxiliary information is used to indicate a first synchronization signal block SSB that is actually sent and a second SSB associated with a target physical channel. The network device 300 specifically includes the following functional module:

a first sending module 310, configured to send auxiliary information that satisfies a preset format, where the auxiliary information is used to indicate a first synchronization signal block SSB that is actually sent and a second SSB associated with a target physical channel.

The first sending module 310 includes:

a first sending submodule, configured to: when a terminal performs a cell handover, send first auxiliary information for a target cell; or a second sending submodule, configured to: when a secondary cell is added or configuration of a secondary cell is modified for the terminal, send second auxiliary information for the secondary cell; or a third sending submodule, configured to: when a primary secondary cell is added or configuration of a primary secondary cell is modified for the terminal, send third auxiliary information for the primary secondary cell; or a fourth sending submodule, configured to: when a bandwidth part is added or configuration of a bandwidth part is modified for the terminal, send fourth auxiliary information for the bandwidth part.

The auxiliary information includes first indication information and second indication information, the first indication information is used to indicate the first SSB, and the second indication information is used to indicate the second SSB.

The first indication information is a first indication bitmap that satisfies the preset format, and the first indication bitmap includes: a 4-bit bitmap, an 8-bit bitmap, two 8-bit bitmaps, a 16-bit bitmap, or a 64-bit bitmap. The second indication information is a second indication bitmap that satisfies the preset format, and the second indication bitmap includes: a 4-bit bitmap, an 8-bit bitmap, two 8-bit bitmaps, a 16-bit bitmap, or a 64-bit bitmap.

The auxiliary information includes third indication information, and the third indication information is used to indicate the first SSB and the second SSB.

The third indication information is a third indication bitmap that satisfies the preset format, and the third indication bitmap includes: a 4-bit bitmap, an 8-bit bitmap, two 8-bit bitmaps, a 16-bit bitmap, a 64-bit bitmap, or an 80-bit bitmap.

When the third indication bitmap is an 80-bit bitmap, the third indication bitmap includes one 64-bit bitmap and one 16-bit bitmap, or the third indication bitmap includes one 64-bit bitmap and two 8-bit bitmaps, or the third indication bitmap includes one 80-bit bitmap. The network device 300 further includes:

an allocation module, configured to allocate a target transmission resource for the first SSB; and a second sending module, configured to send the first SSB over the target transmission resource.

The network device 300 further includes:

a third sending module, configured to send configuration information for the target physical channel.

The target physical channel includes at least one of the following: a transmission channel or a control channel corresponding to a random access message, a transmission channel or a control channel corresponding to other system information, and a transmission channel or a control channel corresponding to a paging message, and the random access message includes a message 1, a message 2, a message 3, or a message 4 in a random access procedure.

It should be noted that, the network device in this embodiment of this disclosure can ensure that terminals in different states have a consistent understanding of resource allocation, thereby avoiding unwanted resource waste and lowering complexity of system resource configuration.

To better achieve the foregoing objectives, an embodiment of this disclosure further provides a network device, where the network device includes a processor, a memory, and a program stored in the memory and capable of running on the processor, where when the processor executes the program, the steps of the foregoing transmission resource indication method are implemented. An embodiment of the invention further provides a computer-readable storage medium, where the computer-readable storage medium stores a program, and when the program is executed by a processor, the steps in the foregoing transmission resource indication method are implemented.

Specifically, an embodiment of this disclosure further provides a network device. As shown in FIG. 4, the network device 400 includes: an antenna 41, a radio frequency apparatus 42, and a baseband apparatus 43. The antenna 41 is connected to the radio frequency apparatus 42. In the uplink direction, the radio frequency device 42 receives information through the antenna 41, and sends the received information to the baseband apparatus 43 for processing. In the downlink direction, the baseband apparatus 43 processes information to be sent and sends the information to the radio frequency apparatus 42, and the radio frequency apparatus 42 processes the received information and sends the information through the antenna 41.

The foregoing frequency band processing apparatus may be located in the baseband apparatus 43, and the method performed by the network device in the foregoing embodiment may be implemented in the baseband apparatus 43. The baseband apparatus 43 includes a processor 44 and a memory 45.

The baseband apparatus 43 may include, for example, at least one baseband board, and a plurality of chips are arranged on the baseband board. As shown in FIG. 4, one of the chips is, for example, the processor 44, which is connected to the memory 45, to invoke a program in the memory 45, so as to perform the operations of the network device shown in the foregoing method embodiment.

The baseband apparatus 43 may further include a network interface 46 for exchanging information with the radio frequency apparatus 42. The interface is, for example, a common public radio interface (common public radio interface, CPRI for short).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 45 may be a volatile memory or a non-volatile memory, or may include both a volatile memory and a non-volatile memory. The non-volatile memory may be a read-only memory (Read-Only Memory, ROM for short), a programmable read-only memory (Programmable ROM, PROM for short), an erasable programmable read-only memory (Erasable PROM, EPROM for short), an electrically erasable programmable read-only memory (Electrically EPROM, EEPROM for short), or a flash memory. The volatile memory may be a random access memory (Random Access Memory, RAM for short), which is used as an external cache. By way of exemplary but not restrictive description, many forms of RAMs are available, such as a static random access memory (Static RAM, SRAM for short), a dynamic random access memory (Dynamic RAM, DRAM for short), a synchronous dynamic random access memory (Synchronous DRAM, SDRAM for short), a double data rate synchronous dynamic random access memory (Double Data Rate SDRAM, DDRSDRAM for short), an enhanced synchronous dynamic random access memory (Enhanced SDRAM, ESDRAM for short), a synchronous link dynamic random access memory (Synchlink DRAM, SLDRAM for short), and a direct rambus random access memory (Direct Rambus RAM, DRRAM for short). The memory 45 described in this application is intended to include but not limited to these and any other suitable types of memories.

Specifically, the network device in this embodiment of this disclosure further includes a program stored in the memory 45 and capable of running on the processor 44, and the processor 44 invokes the program in the memory 45 to perform the method performed by the modules show in FIG. 3.

Specifically, the program, when invoked by the processor 44, can be used to perform: sending auxiliary information that satisfies a preset format, where the auxiliary information is used to indicate a first synchronization signal block SSB that is actually sent and a second SSB associated with a target physical channel.

Specifically, the program, when invoked by the processor 44, may be used to perform:

when a terminal performs a cell handover, sending first auxiliary information for a target cell; or when a secondary cell is added or configuration of a secondary cell is modified for the terminal, sending second auxiliary information for the secondary cell; or when a primary secondary cell is added or configuration of a primary secondary cell is modified for the terminal, sending third auxiliary information for the primary secondary cell; or when a bandwidth part is added or configuration of a bandwidth part is modified for the terminal, sending fourth auxiliary information for the bandwidth part.

The auxiliary information includes first indication information and second indication information, the first indication information is used to indicate the first SSB, and the second indication information is used to indicate the second SSB.

The first indication information is a first indication bitmap that satisfies the preset format, and the first indication bitmap includes: a 4-bit bitmap, an 8-bit bitmap, two 8-bit bitmaps, a 16-bit bitmap, or a 64-bit bitmap. The second indication information is a second indication bitmap that satisfies the preset format, and the second indication bitmap includes: a 4-bit bitmap, an 8-bit bitmap, two 8-bit bitmaps, a 16-bit bitmap, or a 64-bit bitmap.

The auxiliary information includes third indication information, and the third indication information is used to indicate the first SSB and the second SSB.

The third indication information is a third indication bitmap that satisfies the preset format, and the third indication bitmap includes: a 4-bit bitmap, an 8-bit bitmap, two 8-bit bitmaps, a 16-bit bitmap, a 64-bit bitmap, or an 80-bit bitmap.

When the third indication bitmap is an 80-bit bitmap, the third indication bitmap includes one 64-bit bitmap and one 16-bit bitmap, or the third indication bitmap includes one 64-bit bitmap and two 8-bit bitmaps, or the third indication bitmap includes one 80-bit bitmap.

Specifically, the program, when invoked by the processor 44, may be used to perform: allocating a target transmission resource for the first SSB; and sending the first SSB over the target transmission resource.

Specifically, the program, when invoked by the processor 44, may be used to perform: sending configuration information for the target physical channel.

The target physical channel includes at least one of the following: a transmission channel or a control channel corresponding to a random access message, a transmission channel or a control channel corresponding to other system information, and a transmission channel or a control channel corresponding to a paging message, and the random access message includes a message 1, a message 2, a message 3, or a message 4 in a random access procedure.

The network device may be a base transceiver station (Base Transceiver Station, BTS for short) in global system for mobile communications (Global System of Mobile communication, GSM for short) or code division multiple access (Code Division Multiple Access, CDMA for short), or may be a NodeB (NodeB, NB for short) in wideband code division multiple access (Wideband Code Division Multiple Access, WCDMA for short), or may be an evolved NodeB (evolvedNodeB, eNB or eNodeB for short) in LTE, or a relay station or an access point, or a base station in the future 5G network. This is not limited herein.

The network device in this embodiment of this disclosure can ensure that terminals in different states have a consistent understanding of resource allocation, thereby avoiding unwanted resource waste and lowering complexity of system resource configuration.

The foregoing embodiment describes the transmission resource indication method of this disclosure on the network device side. The following embodiment further describes a transmission resource indication method on a terminal side with reference to the accompanying drawings.

As shown in FIG. 5, the transmission resource indication method, applied to a terminal side, in this embodiment of this disclosure may include the following step:

Step 51: Receive auxiliary information that satisfies a preset format, where the auxiliary information is used to indicate a first synchronization signal block SSB actually sent by a network device and a second SSB associated with a target physical channel.

The first SSB and the second SSB mentioned herein may be the same or different, which is not specifically limited herein. The preset format may be a signaling format, an encapsulation format, an encoding format, or the like that is predefined in a protocol. The target physical channel may also be referred to as a target physical resource, a target physical signal, a target monitoring occasion, a target search space, or other particular technical vocabulary. The terminal determines an actual resource allocation status based on the auxiliary information, and regardless of an idle state or a connected state, the terminal can have a consistent understanding of resource allocation with other terminals, thereby avoiding unwanted resource waste.

The foregoing auxiliary information may be information newly added in a protocol, or may be information used to indicate an SSB in RRC, or may be information used to indicate an SSB in RMSI. A specific information format of the auxiliary information may include but is not limited to the following several implementations: the auxiliary information includes first indication information and second indication information, the first indication information is used to indicate the first SSB, and the second indication information is used to indicate the second SSB. The number of bits included in the first indication information may be: 4, 8, 16, 64, or 80. For example, the first indication information may be a first indication bitmap that satisfies the preset format, and the first indication bitmap includes: a 4-bit bitmap, an 8-bit bitmap, two 8-bit bitmaps, a 16-bit bitmap, a 64-bit bitmap, one 64-bit bitmap and one 16-bit bitmap, one 64-bit bitmap and two 8-bit bitmaps, one 80-bit bitmap, and the like. Similarly, the number of bits included in the second indication information may also be: 4, 8, 16, 64, or 80. The second indication information may also be a second indication bitmap that satisfies the preset format, and the second indication bitmap includes: a 4-bit bitmap, an 8-bit bitmap, two 8-bit bitmaps, a 16-bit bitmap, a 64-bit bitmap, one 64-bit bitmap and one 16-bit bitmap, one 64-bit bitmap and two 8-bit bitmaps, one 80-bit bitmap, and the like. It should be noted that the number of bits included in the first indication information and that of bits included in the second indication information may be the same or different. This manner corresponds to the foregoing manner 1, and all the embodiments of the foregoing manner 1 are applicable thereto, and therefore details are not repeated herein. In addition, the auxiliary information includes third indication information, and the third indication information is used to indicate the first SSB and the second SSB. The third indication information is similar to the first indication information or the second indication information. The number of bits included in the third indication information may be: 4, 8, 16, 64, 80, or the like. For example, the third indication information may also be a third indication bitmap that satisfies the preset format, and the third indication bitmap includes: a 4-bit bitmap, an 8-bit bitmap, two 8-bit bitmaps, a 16-bit bitmap, a 64-bit bitmap, one 64-bit bitmap and one 16-bit bitmap, one 64-bit bitmap and two 8-bit bitmaps, one 80-bit bitmap, or the like. This manner corresponds to the foregoing manner 2, and all the embodiments of the foregoing manner 2 are applicable thereto, and therefore details are not repeated herein.

Transmission resource indication manners are further described in the following embodiments of this disclosure with reference to different application scenarios.

Corresponding to scenario 1, step 51 may include: when a cell handover is performed, receiving first auxiliary information for a target cell. In this scenario, when the terminal performs the cell handover, a base station sends the first auxiliary information for the target cell to the terminal, where the first auxiliary information is used to indicate a first synchronization signal block SSB that is actually sent and a second SSB associated with a target physical channel. All the embodiments of scenario 1 are applicable thereto, and therefore details are not repeated herein.

Corresponding to scenario 2, step 51 may include: when a secondary cell is added or configuration of a secondary cell changes, receiving second auxiliary information for the secondary cell. In this scenario, when a secondary cell (Secondary Cell, Scell) for the terminal is added or Scell configuration is modified, the base station sends second auxiliary information for the Scell to the terminal, where the second auxiliary information is used to indicate a first SSB actually sent by the Scell and a second SSB associated with a target physical channel. All the embodiments of scenario 2 are applicable thereto, and therefore details are not repeated herein.

Corresponding to scenario 3, step 51 may include: when a primary secondary cell is added or configuration of a primary secondary cell changes, receiving third auxiliary information for the primary secondary cell. In this scenario, when the base station adds a primary secondary cell (Primary Secondary Cell, PScell) for the terminal or modifies PScell configuration, the base station sends third auxiliary information for the PScell to the terminal, where the third auxiliary information is used to indicate a first SSB actually sent by the PScell and a second SSB associated with a target physical channel. All the embodiments of scenario 3 are applicable thereto, and therefore details are not repeated herein.

Corresponding to scenario 4, step 51 may include: when a bandwidth part is added or configuration of a bandwidth part changes, receiving fourth auxiliary information for the bandwidth part. In this scenario, when the base station adds a BWP for the terminal or modifies BWP configuration, the base station sends fourth auxiliary information for the BWP to the terminal, where the fourth auxiliary information is used to indicate a first SSB actually sent on the BWP and a second SSB associated with a target physical channel. All the embodiments of scenario 4 are applicable thereto, and therefore details are not repeated herein.

In an embodiment of this disclosure, after step 51, the transmission resource indication method further includes: determining a target transmission resource based on the first SSB indicated by the auxiliary information; and receiving the first SSB over the target transmission resource.

Before the receiving the first SSB over the target transmission resource, the method further includes: receiving indication information indicating transmission resources for other channels or signals; and if a transmission resource indicated by the indication information and the target transmission resource at least partially overlap, receiving the first SSB over the overlapping resource. In other words, the terminal determines, based on the auxiliary information, the first SSB actually sent by the network device, and the terminal determines that the network device uses the corresponding resources to send these SSBs. If transmission resources of other channels or signals (that is, channels or signals other than the SSB) and a resource of the first SSB indicated by the auxiliary information overlap, the terminal receives an SSB on the overlapping resource, and does not receive other channels or signals on the overlapping part.

In an embodiment of this disclosure, the transmission resource indication method further includes: receiving configuration information for the target physical channel. After the receiving auxiliary information that satisfies a preset format and receiving configuration information for the target physical channel, the method further includes: determining a transmission location of the target physical channel based on the second SSB indicated by the auxiliary information and the configuration information. The transmission location herein includes, but is not limited to: a time domain transmission location and/or a frequency domain transmission location. It should be noted that when the base station does not send auxiliary information to the terminal, the terminal considers that receiving and sending locations of the target physical channel is determined based on the maximum number of SSBs that each SS burst set can support in this frequency band.

The target physical channel includes at least one of the following: a transmission channel or a control channel corresponding to a random access message, a transmission channel or a control channel corresponding to other system information, and a transmission channel or a control channel corresponding to a paging message, and the random access message includes a message 1, a message 2, a message 3, or a message 4 in a random access procedure.

For example, the target physical channel is a transmission channel and/or control channel corresponding to the random access message. When the target physical channel is a channel corresponding to msg1: the terminal considers that the auxiliary information indicates the second SSB actually associated with the target physical channel, and the terminal considers that there is an association relationship between the second SSB and an RO on a target cell, an Scell, a PScell, or a BWP. The terminal determines a sending location of msg1 based on PRACH configuration on the target cell, the Scell, the PScell, or the BWP and the association relationship, between the SSB and the RO, indicated by the auxiliary information.

When the target physical channel is a channel corresponding to msg2: the terminal considers that the auxiliary information indicates the second SSB actually associated with the target physical channel, and the terminal considers that there is an association relationship between the second SSB and msg2 configuration (for example, a PDCCH SS or PDCCH monitoring occasion) on a target cell, an Scell, a PScell, or a BWP. The terminal determines at least one of the PDCCH monitoring occasion of msg2 and a receiving location of msg2 based on the msg2 configuration on the target cell, the Scell, the PScell, or the BWP and the association relationship, between the SSB and the RO, indicated by the auxiliary information.

When the target physical channel is a channel corresponding to msg3: the terminal considers that the auxiliary information indicates the second SSB actually associated with the target physical channel, and the terminal considers that there is an association relationship between the second SSB and msg3 configuration (for example, a PDCCH SS or PDCCH monitoring occasion) of retransmission on a target cell, an Scell, a PScell, or a BWP. The terminal determines at least one of the PDCCH monitoring occasion of msg3 scheduling and retransmission and a retransmission sending location of msg3 based on the msg3 configuration on the target cell, the Scell, the PScell, or the BWP and the association relationship, between the SSB and the RO, indicated by the auxiliary information.

When the target physical channel is a channel corresponding to msg4: the terminal considers that the auxiliary information indicates the second SSB actually associated with the target physical channel, and the terminal considers that there is an association relationship between the second SSB and msg4 configuration (for example, a PDCCH SS or PDCCH monitoring occasion) on a target cell, an Scell, a PScell, or a BWP. The terminal determines at least one of the PDCCH monitoring occasion of msg4 and a receiving location of msg4 based on the msg4 configuration on the target cell, the Scell, the PScell, or the BWP and the association relationship, between the SSB and the RO, indicated by the auxiliary information.

For example, the target physical channel is a transmission channel and/or control channel corresponding to the OSI. The terminal considers that the auxiliary information indicates the second SSB actually associated with the target physical channel, and the user considers that there is an association relationship between the second SSB and OSI configuration (for example, a system information window SI-window, a PDCCH SS, or a PDCCH monitoring occasion) on a target cell, an Scell, a PScell, or a BWP. The terminal determines at least one of the PDCCH monitoring occasion of the OSI and a receiving location of the OSI based on the OSI configuration on the target cell, the Scell, the PScell, or the BWP and the association relationship, between the SSB and the OSI, indicated by the auxiliary information.

For example, the target physical channel is a transmission channel and/or control channel corresponding to the paging. The terminal considers that the auxiliary information indicates the second SSB actually associated with the target physical channel, and the terminal considers that there is an association relationship between the second SSB and padging PDCCH configuration (for example, a paging transmission location, a PDCCH SS, or a PDCCH monitoring occasion) on a target cell, an Scell, a PScell, or a BWP. The terminal determines at least one of the PDCCH monitoring occasion of the paging and a receiving location of the paging based on the paging configuration on the target cell, the Scell, the PScell, or the BWP and the association relationship, between the SSB and the paging configuration, indicated by the auxiliary information.

In the transmission resource indication method in this embodiment of this disclosure, it can be ensured that the terminal, when in different states, can still have a consistent understanding of resource allocation with other terminals, thereby avoiding unwanted resource waste and lowering complexity of system resource configuration.

The foregoing embodiments describe the transmission resource indication methods in different scenarios. The following further describes the corresponding terminal with reference to the accompanying drawings.

As shown in FIG. 6, a terminal 600 in this embodiment of this disclosure can implement details of the method for receiving auxiliary information that satisfies a preset format in the forgoing embodiments and achieve the same effects, where the auxiliary information is used to indicate a first synchronization signal block SSB actually sent by a network device and a second SSB associated with a target physical channel. The terminal 600 specifically includes the following functional module:

a first receiving module 610, configured to receive auxiliary information that satisfies a preset format, where the auxiliary information is used to indicate a first synchronization signal block SSB actually sent by a network device and a second SSB associated with a target physical channel. The first receiving module 610 includes:

a first receiving submodule, configured to: when a cell handover is performed, receive first auxiliary information for a target cell; or a second receiving submodule, configured to: when a secondary cell is added or configuration of a secondary cell changes, receive second auxiliary information for the secondary cell; or a third receiving submodule, configured to: when a primary secondary cell is added or configuration of a primary secondary cell changes, receive third auxiliary information for the primary secondary cell; or a fourth receiving submodule, configured to: when a bandwidth part is added or configuration of a bandwidth part changes, receive fourth auxiliary information for the bandwidth part.

The auxiliary information includes first indication information and second indication information, the first indication information is used to indicate the first SSB, and the second indication information is used to indicate the second SSB.

The first indication information is a first indication bitmap that satisfies the preset format, and the first indication bitmap includes: a 4-bit bitmap, an 8-bit bitmap, two 8-bit bitmaps, a 16-bit bitmap, or a 64-bit bitmap. The second indication information is a second indication bitmap that satisfies the preset format, and the second indication bitmap includes: a 4-bit bitmap, an 8-bit bitmap, two 8-bit bitmaps, a 16-bit bitmap, or a 64-bit bitmap.

The auxiliary information includes third indication information, and the third indication information is used to indicate the first SSB and the second SSB.

The third indication information is a third indication bitmap that satisfies the preset format, and the third indication bitmap includes: a 4-bit bitmap, an 8-bit bitmap, two 8-bit bitmaps, a 16-bit bitmap, a 64-bit bitmap, or an 80-bit bitmap.

When the third indication bitmap is an 80-bit bitmap, the third indication bitmap includes one 64-bit bitmap and one 16-bit bitmap, or the third indication bitmap includes one 64-bit bitmap and two 8-bit bitmaps, or the third indication bitmap includes one 80-bit bitmap.

The terminal 600 further includes:

a determining module, configured to determine a target transmission resource based on the first SSB indicated by the auxiliary information; and a second receiving module, configured to receive the first SSB over the target transmission resource.

The terminal 600 further includes:

a third receiving module, configured to receive indication information indicating transmission resources for other channels or signals; and a fourth receiving module, configured to: if a transmission resource indicated by the indication information and the target transmission resource at least partially overlap, receive the first SSB over the overlapping resource.

The terminal 600 further includes:

a fifth receiving module, configured to receive configuration information for the target physical channel.

After the steps of receiving auxiliary information that satisfies a preset format and receiving configuration information for the target physical channel, the following is further included:

determining a transmission location of the target physical channel based on the second SSB indicated by the auxiliary information and the configuration information.

The transmission location includes: a time domain transmission location and/or a frequency domain transmission location.

The target physical channel includes at least one of the following: a transmission channel or a control channel corresponding to a random access message, a transmission channel or a control channel corresponding to other system information, and a transmission channel or a control channel corresponding to a paging message, and the random access message includes a message 1, a message 2, a message 3, or a message 4 in a random access procedure.

It should be noted that, the terminal in this embodiment of this disclosure, when in different states, can still have a consistent understanding of resource allocation with other terminals, thereby avoiding unwanted resource waste and lowering complexity of system resource configuration.

It should be noted that, it should be understood that the division of the various modules of the foregoing network device and terminal is merely logical function division, and during actual implementation, the various module may be completely or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules is similar thereto. In addition, all or some of these modules may be integrated together or implemented independently. The processing element herein may be an integrated circuit chip, having a signal processing capability. During implementation, the steps of the foregoing method or the foregoing modules can be completed by hardware integrated logic circuits in the processor element or instructions in the form of software.

For example, the foregoing modules may be one or more integrated circuits configured to implement the foregoing method, for example, may be one or more application-specific integrated circuits (Application Specific Integrated Circuit, ASIC for short), or one or more microprocessors (digital signal processor, DSP for short), or, one or more field programmable gate arrays (Field Programmable Gate Array, FPGA for short), or the like. For another example, when one of the foregoing modules is implemented in the form of program code being scheduled by a processing element, the processing element may be a general-purpose processor, such as a central processing unit (Central Processing Unit, CPU for short) or another processor that can invoke program code. For another example, these modules may be integrated together and implemented in the form of a system-on-a-chip (system-on-a-chip, SOC for short).

To better achieve the foregoing objective, further, FIG. 7 is a schematic structural diagram of hardware of a terminal for implementing the various embodiments of this disclosure. The terminal 70 includes, but is not limited to: components such as a radio frequency unit 71, a network module 72, an audio output unit 73, an input unit 74, a sensor 75, a display unit 76, a user input unit 77, an interface unit 78, a memory 79, a processor 710, and a power supply 711. It can be understood by persons skilled in the art that the structure of the terminal shown in FIG. 7 does not constitute a limitation on the terminal, and the terminal may include more or fewer components than those shown in the figure, or combine some components, or have different component arrangements. In the embodiments of this disclosure, the terminal includes, but is not limited to, a mobile phone, a tablet computer, a notebook computer, a palmtop computer, a vehicle-mounted terminal, a wearable device, a pedometer, or the like.

The radio frequency unit 71 is configured to receive and send data under the control of the processor 710, and is specifically configured to receive auxiliary information that satisfies a preset format, where the auxiliary information is used to indicate a first synchronization signal block SSB actually sent by a network device and a second SSB associated with a target physical channel.

The terminal in this embodiment of this disclosure, when in different states, can still have a consistent understanding of resource allocation with other terminals, thereby avoiding unwanted resource waste and lowering complexity of system resource configuration.

It should be understood that in this embodiment of this disclosure, the radio frequency unit 71 may be configured to receive and send signals in a process of receiving and sending information or calling. Specifically, the radio frequency unit 71 receives downlink data from a base station for processing by the processor 710, and sends uplink data to the base station. Generally, the radio frequency unit 71 includes, but is not limited to, an antenna, at least one amplifier, a transceiver, a coupler, a low noise amplifier, a duplexer, and the like. In addition, the radio frequency unit 71 may further communicate with a network and other devices through a wireless communications system.

The terminal provides wireless broadband Internet access to a user through the network module 72, for example, helps the user receive and send emails, browse web pages, and access streaming media.

The audio output unit 73 may convert audio data received by the radio frequency unit 71 or the network module 72 or stored in the memory 79 into an audio signal, and output the audio signal as sound. Moreover, the audio output unit 73 may further provide an audio output (for example, call signal receiving sound and message receiving sound) related to a specific function performed by the terminal 70. The audio output unit 73 includes a speaker, a buzzer, a receiver, and the like.

The input unit 74 is configured to receive an audio signal or a video signal. The input unit 74 may include a graphics processing unit (Graphics Processing Unit, GPU) 741 and a microphone 742. The graphics processing unit 741 processes image data of a static image or video obtained by an image capture apparatus (such as, a camera) in a video capture mode or an image capture mode. A processed image frame may be displayed on the display unit 76. The image frames processed by the GPU 741 can be stored in the memory 79 (or another storage medium) or sent by the radio frequency unit 71 or the network module 72. The microphone 742 can receive sound, and can process such sound into audio frequency data. The processed audio data can be converted into a format output that can be sent to a mobile communications base station through the radio frequency unit 71 in a telephone call mode.

The terminal 70 further includes at least one sensor 75, such as a light sensor, a motion sensor, and other sensors. Specifically, the light sensor includes an ambient light sensor and a proximity sensor, where the ambient light sensor can adjust brightness of the display panel 761 depending on luminance of ambient light, and the proximity sensor can turn off the display panel 761 and/or backlight when the terminal 70 moves near the ear. As a type of motion sensor, an accelerometer sensor can detect accelerations in all directions (generally three axes), and can detect the magnitude and direction of gravity when it is still. The accelerometer sensor may be configured to identify a terminal posture (for example, switching between a landscape mode and a portrait mode, related games, and magnetometer posture calibration), perform vibration identification-related functions (for example, a pedometer and a knock), and the like. The sensor 75 may further include a fingerprint sensor, a pressure sensor, an iris sensor, a molecular sensor, a gyroscope, a barometer, a hygrometer, a thermometer, an infrared sensor, and the like. Details are not described herein again.

The display unit 76 is configured to display information input by a user or information provided to a user. The display unit 76 may include a display panel 761, and the display panel 761 may be configured in a form of a liquid crystal display (liquid crystal display, LCD), an organic light-emitting diode (organic light-emitting diode, OLED), or the like.

The user input unit 77 may be configured to receive entered digit or character information and generate a key signal input related to user setting and function control of the terminal. Specifically, the user input unit 77 includes a touch panel 771 and another input device 772. The touch panel 771 is also referred to as a touchscreen, and can collect a touch operation on or near the touch panel 771 by a user (for example, an operation on or near the touch panel 771 by the user with any suitable object or accessory such as a finger or a stylus). The touch panel 771 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 710, and receives and executes a command sent by the processor 710. In addition, the touch panel 771 can be implemented by various types such as a resistive type, a capacitive type, an infrared ray type or a surface acoustic wave type. In addition to the touch panel 771, the user input unit 77 may also include another input device 772. Specifically, the another input device 772 may include, but is not limited to, a physical keyboard, functional keys (for example, a volume control key and a switch key), a trackball, a mouse, and a joystick. Details are not described herein again.

Further, the touch panel 771 may cover the display panel 761. When the touch panel 771 detects a touch operation on or near the touch panel 771, the touch operation is transmitted to the processor 710 to determine a type of a touch event, and then the processor 710 provides corresponding visual output on the display panel 761 according to the type of the touch event. Although in FIG. 7, the touch panel 771 and the display panel 761 are two independent components for implementing input and output functions of the terminal, in some embodiments, the touch panel 771 and the display panel 761 may be integrated to implement the input and output functions of the terminal. Details are not limited herein.

The interface unit 78 is an interface connecting an external apparatus to the terminal 70. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 78 may be configured to receive an input (for example, data information and power) from an external apparatus and transmit the received input to one or more elements within the terminal 70, or may be configured to transmit data between the terminal 70 and the external apparatus.

The memory 79 may be configured to store software programs and various data. The memory 79 may mainly include a program storage area and a data storage area. The program storage area may store an operating system, and an application program required by at least one function (for example, a sound playing function and an image playing function). The data storage area may store data created according to use of the mobile phone (for example, audio data and a phonebook), and the like. In addition, the memory 79 may include a high-speed random access memory, and may also include a non-volatile memory, such as at least one disk storage device, a flash memory device, or other volatile solid-state memory devices.

The processor 710 is a control center of the terminal. The processor 710 uses various interfaces and lines to connect the various parts of the entire terminal, and performs various functions of the terminal and processes data by running or executing software programs and/or modules stored in the memory 79 and invoking data stored in the memory 79, to monitor the terminal as a whole. The processor 710 may include one or more processing units. Optionally, the processor 710 may integrate an application processor and a modem processor. The application processor mainly deals with an operating system, a user interface, and an application program. The modem processor mainly deals with wireless communication. It can be understood that alternatively, the modem processor may not be integrated into the processor 710.

The terminal 70 may further include a power supply 711 (for example, a battery) that supplies power to various components. Optionally, the power supply 711 may be logically connected to the processor 710 through a power supply management system, to perform functions of managing charging, discharging, and power consumption through the power supply management system.

In addition, the terminal 70 includes some functional modules not shown. Details are not described herein again.

Optionally, an embodiment of this disclosure further provides a terminal, including the processor 710, the memory 79, and a program stored in the memory 79 and capable of running on the processor 710, where when the program is executed by the processor 710, the processes of the foregoing embodiments of the transmission resource indication method are implemented, and the same technical effects can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (Radio Access Network, RAN for short). The wireless terminal may be a mobile terminal, such as a mobile phone (or referred to as a "cellular" phone) and a computer with a mobile terminal, and may be, for example, a portable, pocket, handheld, computer built-in, or vehicle-mounted mobile apparatus, which exchange language and/or data with a radio access network. For example, the wireless terminal is a device such as a personal communication service (Personal Communication Service, PCS for short) telephone, a cordless telephone, a session initiation protocol (Session Initiation Protocol, SIP for short) phone, a wireless local loop (Wireless Local Loop, WLL for short) station, or a personal digital assistant (Personal Digital Assistant, PDA for short). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), or user equipment (User Device or User Equipment). This is not limited herein.

An embodiment of this disclosure further provides a computer-readable storage medium, which stores a program, where when the program is executed by a processor, the processes of the foregoing embodiments of the transmission resource indication method are implemented, and the same technical effects can be achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of this disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of this disclosure may be integrated into one processing unit, or each unit may have separate physical existence, or two or more units may be integrated in one unit.

If the function is implemented in the form of software function units and sold or used as independent products, the function may be stored in a computer readable storage medium. Based on this understanding, the essence of the technical solutions of this disclosure, or the part contributing to the prior art, or some of the technical solutions may be presented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

In addition, it should be noted that in the apparatuses and methods of this disclosure, it is obvious that the components or the steps may be divided and/or recombined. These divisions and/or re-combinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of this disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of this disclosure.

Therefore, the objective of this disclosure may also be achieved by running a program or a set of programs on any computing apparatus. The computing apparatus may be a well-known general-purpose apparatus. Therefore, the objective of this disclosure may also be achieved only by providing a program product including program code for implementing the method or the apparatus. In other words, such a program product also constitutes this disclosure, and a storage medium storing such a program product also constitutes this disclosure. Obviously, the storage medium may be any well-known storage medium or any storage medium to be developed in the future. It should be further noted that in the apparatuses and methods of this disclosure, it is obvious that the components or the steps may be divided and/or recombined. These divisions and/or re-combinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

The optional implementations of this disclosure are described above. It should be noted that persons of ordinary skill in the technical field may further make several improvements and refinements without departing from the principles described in this disclosure, and these improvements and refinements also fall within the protection scope of this disclosure.

What is claimed is:

1. A terminal, comprising a processor, a memory, and a program stored in the memory and capable of running on the processor, wherein the program is executed by the processor to implement:

receiving auxiliary information that satisfies a preset format, wherein the auxiliary information is used to indicate a first synchronization signal block SSB actually sent by a network device and a second SSB associated with a target physical channel;

after the step of receiving auxiliary information that satisfies a preset format, the program is further executed by the processor to implement:

determining a target transmission resource based on the first SSB indicated by the auxiliary information; and receiving the first SSB over the target transmission resource.

2. The terminal according to claim 1, wherein the step of receiving auxiliary information that satisfies a preset format comprises:

when a cell handover is performed, receiving first auxiliary information for a target cell; or when a secondary cell is added or configuration of a secondary cell changes, receiving second auxiliary information for the secondary cell; or when a primary secondary cell is added or configuration of a primary secondary cell changes, receiving third auxiliary information for the primary secondary cell; or when a bandwidth part is added or configuration of a bandwidth part changes, receiving fourth auxiliary information for the bandwidth part.

3. The terminal according to claim 1, wherein the auxiliary information comprises first indication information and second indication information, the first indication information is used to indicate the first SSB, and the second indication information is used to indicate the second SSB.

4. The terminal according to claim 1, wherein the auxiliary information comprises third indication information, and the third indication information is used to indicate the first SSB and the second SSB.

5. The terminal according to claim 1, before the receiving the first SSB over the target transmission resource, the program is further executed by the processor to implement:
receiving indication information indicating transmission resources for other channels or signals; and
if a transmission resource indicated by the indication information and the target transmission resource at least partially overlap, receiving the first SSB over the overlapping resource.

6. The terminal according to claim 1, wherein the program is further executed by the processor to implement:
receiving configuration information for the target physical channel.

7. The terminal according to claim 6, after the steps of receiving auxiliary information that satisfies a preset format and receiving configuration information for the target physical channel, the program is further executed by the processor to implement:
determining a transmission location of the target physical channel based on the second SSB indicated by the auxiliary information and the configuration information.

8. The terminal according to claim 7, wherein the transmission location comprises: a time domain transmission location and/or a frequency domain transmission location.

9. The terminal according to claim 1, wherein the target physical channel comprises at least one of the following: a transmission channel or a control channel corresponding to a random access message, a transmission channel or a control channel corresponding to other system information, and a transmission channel or a control channel corresponding to a paging message, and the random access message comprises a message 1, a message 2, a message 3, or a message 4 in a random access procedure.

10. A network device, comprising a processor, a memory, and a program stored in the memory and capable of running on the processor, wherein the program is executed by the processor to implement:
sending auxiliary information that satisfies a preset format, wherein the auxiliary information is used to indicate a first synchronization signal block SSB that is actually sent and a second SSB associated with a target physical channel;
wherein the program is further executed by the processor to implement:
allocating a target transmission resource for the first SSB; and
sending the first SSB over the target transmission resource.

11. The network device according to claim 10, wherein the step of sending auxiliary information that satisfies a preset format comprises:
when a terminal performs a cell handover, sending first auxiliary information for a target cell; or
when a secondary cell is added or configuration of a secondary cell is modified for the terminal, sending second auxiliary information for the secondary cell; or
when a primary secondary cell is added or configuration of a primary secondary cell is modified for the terminal, sending third auxiliary information for the primary secondary cell; or
when a bandwidth part is added or configuration of a bandwidth part is modified for the terminal, sending fourth auxiliary information for the bandwidth part.

12. The network device according to claim 10, wherein the auxiliary information comprises first indication information and second indication information, the first indication information is used to indicate the first SSB, and the second indication information is used to indicate the second SSB.

13. The network device according to claim 10, wherein the auxiliary information comprises third indication information, and the third indication information is used to indicate the first SSB and the second SSB.

14. The network device according to claim 10, wherein the program is further executed by the processor to implement:
sending configuration information for the target physical channel.

15. The network device according to claim 10, wherein the target physical channel comprises at least one of the following: a transmission channel or a control channel corresponding to a random access message, a transmission channel or a control channel corresponding to other system information, or a transmission channel or a control channel corresponding to a paging message, and the random access message comprises a message 1, a message 2, a message 3, or a message 4 in a random access procedure.

16. A transmission resource indication method, applied to a terminal side, wherein the method comprises:
receiving auxiliary information that satisfies a preset format, wherein the auxiliary information is used to indicate a first synchronization signal block SSB actually sent by a network device and a second SSB associated with a target physical channel;
after the step of receiving auxiliary information that satisfies a preset format, the method further comprises:
determining a target transmission resource based on the first SSB indicated by the auxiliary information; and
receiving the first SSB over the target transmission resource.

17. The transmission resource indication method according to claim 16, wherein the step of receiving auxiliary information that satisfies a preset format comprises:
when a cell handover is performed, receiving first auxiliary information for a target cell; or
when a secondary cell is added or configuration of a secondary cell changes, receiving second auxiliary information for the secondary cell; or
when a primary secondary cell is added or configuration of a primary secondary cell changes, receiving third auxiliary information for the primary secondary cell; or
when a bandwidth part is added or configuration of a bandwidth part changes, receiving fourth auxiliary information for the bandwidth part.

18. The transmission resource indication method according to claim 16, wherein the auxiliary information comprises first indication information and second indication information, the first indication information is used to indicate the first SSB, and the second indication information is used to indicate the second SSB.

19. The transmission resource indication method according to claim 16, wherein the auxiliary information comprises third indication information, and the third indication information is used to indicate the first SSB and the second SSB.

20. The transmission resource indication method according to claim 16, before the receiving the first SSB over the target transmission resource, further comprising:
- receiving indication information indicating transmission resources for other channels or signals; and
- if a transmission resource indicated by the indication information and the target transmission resource at least partially overlap, receiving the first SSB over the overlapping resource.

\* \* \* \* \*